Patented Nov. 3, 1942

2,300,433

UNITED STATES PATENT OFFICE 2,300,433

ESTER OF HYDROGENATED POLYMERIZED ROSIN AND METHOD OF MAKING THE SAME

Robert C. Palmer, Pensacola, Fla., assignor to Newport Industries, Inc., Pensacola, Fla., a corporation of Delaware No Drawing. Application April 14, 1941, Serial No. 388,495

12 Claims. (Cl. 260—100)

This invention relates to a high melting stable rosin product and to methods of preparing the same, in particular by esterifying hydrogenated polymerized rosin with polyhydric alcohols.

In the copending application of the present inventor and Carlisle H. Bibb, Serial No. 232,078, filed September 28, 1938, there have been disclosed various methods of increasing the melting point of rosin, either wood or gum, by subjecting the rosin to the action of zinc chloride to produce a product known as partially polymerized, partially disproportionated abietic acid, i. e. containing, in admixture, both dehydro- and dihydroabietic acid together with polymerized abietic acid.

In the copending application of the present inventor and Carlisle H. Bibb Serial No. 240,644, filed November 16, 1938, there is disclosed the discovery that stability toward oxygen of the polymerized or partly polymerized rosin may be further increased by hydrogenation. While hydrogenated rosin cannot be polymerized, since hydrogenation results in a saturation of the double bonds by hydrogen, a polymerized or partially polymerized rosin, however, is still largely unsaturated, even though the polymerization process produces a certain amount of disproportionation and corresponding dehydrogenation. A polymerized or partially polymerized rosin may, therefore, be treated with hydrogen by any one of well-known processes to give a product having an even greater commercial value.

Such a product is useful for the modification of alkyd, phenolic and other synthetic and natural resins, in adhesives, insulations, soaps and sizes, wax compositions, polishes, special soldering fluxes and wherever a high melting point, hydrogenated rosin, finds applicability.

I have now found that the hydrogenated, polymerized rosin may be used for making esters of polyhydric alcohols that are distinguished by high melting point, stability and hardness.

It is therefore an important object of the present invention to provide esters of hydrogenated polymerized rosin and methods of preparing the same.

Other and further objects of this invention will become apparent from the following description and appended claims.

I may take any one of the polymerized or partially polymerized rosins (wood or gum) described in the copending application, Serial No. 232,078, filed September 28, 1938, and subject it to hydrogenation. As an example, I may take the partially polymerized rosin having a capillary melting point of 76 to 78° C., acid value 165, color N to WG, place it in a vessel and subject it to a temperature of 150 to 265° C. in the presence of hydrogen under pressure, which may be between 200 and 15,000 lbs. per square inch and an active base metal hydrogenation catalyst until the remaining double bonds in the rosin have been saturated to the extent of about 50%.

Alternatively, instead of hydrogenating the polymerized or partially polymerized rosin in a batch process, I may conduct the hydrogenation in a continuous process by flowing the liquid rosin under pressure and at elevated temperature over a suitable catalyst in the presence of hydrogen. The so-called Raney catalysts are particularly suited to this type of hydrogenation. The temperature may range from 70 to 230° C., and the pressure from 100 to 5,000 lbs. per square inch. A neutral solvent, such as petroleum naphtha or other solvent, may be employed which favors the lower temperatures and pressures.

If desired or necessary, the hydrogenated rosin may be further refined to remove color bodies or to separate catalyst or rosin compounds with the catalyst. The polyabietic acid in polymerized rosin cannot be vacuum distilled, but may be treated with selective solvents, or fuller's earth, or acids to remove metal compounds, or any combination of such treatments may be used that has a beneficial effect on the visible color or the rosin. Any portion of the rosin which has not been polymerized can, furthermore, be separated by vacuum distillation from the polymerized portion.

The following will serve to illustrate a preferred embodiment of my invention, in accordance with which rosin is first polymerized, then hydrogenated and finally esterified:

Example 1

9600 pounds of WW wood rosin are dissolved in 770 gals. of petroleum solvent boiling between 105 and 140° C. to give a 66% solution of rosin by weight.

The rosin solution so prepared is first dehydrated. This may be accomplished by placing the solution in a still provided with a reflux condenser and a trap for catching any water found to be present in the distillate. The refluxing operation is carried out until only the merest trace of water is left in the solution. The solution is then allowed to cool somewhat to below its boiling point of 132° to 134° C., and 144 lbs. of dry "technical granular" zinc chloride are added slowly in order to avoid undue boiling and subsequent danger of the solution surging over the top of the containing vessel.

Since exposure of zinc chloride to humid air causes it to pick up considerable moisture, such exposure of the zinc chloride prior to actual use is to be avoided.

The amount of zinc chloride added corresponds with 1½% by weight of the rosin undergoing treatment. With this percentage of catalyst, best results are obtained by carrying out the reaction for 12 to 16 hours. The reaction time will vary somewhat with the proportion of catalyst used.

The temperature of the reaction mass during the entire period is kept at about 128 to 138° C., or just under the boiling point of the solution.

At the end of the reaction time, the hot rosin solution is washed as follows, maintaining the washes as well as the rosin solution at about 75° to 80° C.:

| Wash | Volume |
| --- | --- |
| 1st | 400 gals. water. |
| 2nd | 120 gals. 1.5% sulfuric acid. |
| 3rd | 400 gals. water. |
| 4th | Do. |
| 5th | Do. |

Any undissolved zinc chloride and traces of "tarry" matter dissolve in the first wash water. The fifth wash should be free of zinc compounds but washing should be carried out until tests show the absence of zinc compounds and also the absence of chlorides and sulfates.

The washing step is preferably carried out in the reaction vessel by mechanical agitation. Since the solution contains no emulsifying agents, the water settles out rapidly upon cessation of the agitation.

The washed rosin solution is next transferred to a suitable still, where the solvent is evaporated off by passing dry steam through the solution in the still. Final steaming at 210° to 220° C. still temperature is recommended. It is possible to use lower finishing temperatures, but the rosin is quite viscous even at 180° C. with the higher melting types resulting from the polymerization reaction. To obtain the desired melting point of 76° to 77° C., it is necessary that all traces of solvent be steamed off of the rosin.

The foregoing process has readily produced a rosin of the following properties:

| | |
| --- | --- |
| Color | WG |
| Melting point | 75° to 80° C. |
| Acid value | 164 to 167 |
| Rotation | −4 to −8 |
| Ash | Less than 0.01% |

In stating the melting point of rosin or any of the rosin products described herein, it will be understood that such melting points have been determined by the capillary tube method. For the sake of comparison, however, the following relationship exists between the capillary tube method and the so-called drop method, referred to in the Schnorf Patent No. 2,074,192:

76° C. (drop) equals 52° capillary tube
76° C. capillary tube equals 100° C. drop method Higher melting point rosin is obtainable at the expense of using more catalyst and at a sacrifice in color grade and a lowering of acid value. The reaction time can be shortened to from 4 to 8 hours by increasing the proportion of catalyst used to a maximum of 3%, and the color grade can be maintained under these conditions. In general, however, longer time of reaction with any given amount of catalyst tends to give a higher melting point, lower grade and lower acid value in the polymerized product. 1½% of catalyst is the practical minimum in any case.

Hot water is recommended in the washing operation because in view of the high rosin concentration it is obviously necessary that the rosin solution be kept fluid. As an alternative procedure, the rosin solution at the end of the reaction may be diluted and the washing conducted with hot or cold water.

A partially polymerized rosin produced by the process just described is next placed in an autoclave and subjected to a temperature of 150 to 265 C. in the presence of hydrogen under a pressure of 2,000 to 5,000 lbs. per square inch and an active nickel hydrogenation catalyst. The treatment is continued for several hours, or until about 50% of the double bonds remaining after the polymerization step have been saturated. More or less than 50% hydrogenation can also be effected.

The resulting product will be found to have greater stability toward oxidation than the intermediate polymerized or partially polymerized rosin product before hydrogenation.

While, as stated above, hydrogenated rosin cannot be polymerized, a partially hydrogenated rosin may be. Alternatively, therefore, I may take rosin, wood or gum, and subject it to only partial hydrogenation by any of the methods described above and then subject it to polymerization by the processes described in the copending Serial No. 232,078 as a catalyst, or I may use other polymerizing catalysts such as sulfuric acid or borontrifluoride. The advantage of starting with a partially hydrogenated rosin is that no subsequent refining steps are necessary as may be the case where a partially polymerized rosin is later subjected to hydrogenation.

The partially hydrogenated, partially polymerized and disproportionated rosin prepared as disclosed hereinabove is then esterified with a polyhydric alcohol, for instance, glycerine, glycols or penta erythritol, by methods well known in the art.

The range of melting point of the finished ester depends on the degree of polymerization previously effected but is independent of the amount of hydrogenation effected. In general, the increase in melting point in the rosin is carried over to the ester. In the case of conventional substantially completely esterified glycerine esters, for instance, the melting point will be found to be from 5 to 15° higher than that of the rosin used as a starting material, depending on the exact method of effecting esterification, as is well known in the art. A partially hydrogenated, partially polymerized rosin having a melting point (capillary method) 15° higher than the untreated rosin will yield an ester having a melting point at least 15° higher than the normal ester made from the corresponding untreated rosin.

If a polymerized rosin having a very high melting point is to be esterified, some difficulty may be experienced when proceeding according to conventional methods because the great viscosity of liquid rosin at usual esterification temperatures tends to cause foaming when water is released in the course of the esterification. To overcome this difficulty, the esterification may be conducted in the presence of a sufficient amount of a solvent having a boiling point higher than the temperature of esterification, in order to reduce the viscosity. The solvent may finally be distilled off, for instance, by means of steam.

Preferably hydrogenation is limited to slightly less than 50 per cent of theory. If desired, hydrogenation and esterification may be effected simultaneously by treating, for instance, a polyhydric alcohol, the polymerized rosin and a catalyst, such as nickel, palladium or platinum, with hydrogen under pressure and at elevated temperatures.

Polymerization may be effected by other reagents than zinc chloride. Regardless of the exact methods of polymerization and partial disproportionation employed, the esters of the hydrogenated rosins prepared from the polymerized and disproportionated rosins are particularly adapted for use as ingredients in coating compositions, as varnishes, lacquers and the like, in substitution for unsaturated rosin esters and fossil resins. Oils that normally tend to give soft films and hence are not ordinarily used in coating compositions, when used in conjunction with the resinous esters of the present invention, give films of satisfactory hardness.

Many details of procedure and composition may be varied within a wide range without departing from the principles of this invention and it is therefore not my intention to limit the patent granted on this invention otherwise than necessitated by the scope of the appended claims.

I claim as my invention:

1. The method of producing a relatively high melting point rosin product which comprises polymerizing rosin, nuclearly hydrogenating the resulting polymerized rosin and esterifying the hydrogenated polymerized rosin with a polyhydric alcohol.

2. The method of producing a relatively high melting point rosin product which comprises polymerizing rosin by heating the rosin in the presence of zinc chloride under anhydrous conditions and maintaining such conditions throughout the entire heating step, nuclearly hydrogenating the resulting polymerized rosin and esterifying the hydrogenated polymerized rosin with a polyhydric alcohol.

3. The method of producing a relatively high melting stable rosin product which comprises subjecting a polymerized disproportionated rosin to hydrogen under the action of heat, pressure and a hydrogenation catalyst, to hydrogenate said polymerized rosin nuclearly, and esterifying the hydrogenated polymerized disproportionated rosin with a polyhydric alcohol.

4. The method of producing a relatively high melting point rosin product which comprises polymerizing rosin, hydrogenating the resulting polymerized rosin until the double bonds remaining after polymerization have been reduced by about 50 per cent, and esterifying the hydrogenated polymerized rosin with a polyhydric alcohol.

5. The method of producing a relatively high melting point rosin product which comprises polymerizing rosin, hydrogenating the resulting polymerized rosin until the double bonds remaining after polymerization have been reduced by about 50 per cent, and esterifying the hydrogenated polymerized rosin with glycerine.

6. The method of producing a relatively high melting point rosin product which comprises polymerizing rosin, hydrogenating the resulting polymerized rosin until the double bonds remaining after polymerization have been reduced by about 50 per cent, and esterifying the hydrogenated polymerized rosin with a glycol.

7. The method of producing a relatively high melting point rosin product which comprises polymerizing rosin, hydrogenating the resulting polymerized rosin until the double bonds remaining after polymerization have been reduced by about 50 per cent, and esterifying the hydrogenated polymerized rosin with penta erythritol.

8. A relatively high melting stable polyhydric alcohol ester of a nuclearly hydrogenated polymerized rosin.

9. A relatively high melting stable polyhydric alcohol ester of a nuclearly hydrogenated polymerized rosin having about 50 per cent of the double bonds present in polymerized unhydrogenated rosin.

10. A relatively high melting stable glycerine ester of a nuclearly hydrogenated polymerized rosin.

11. A relatively high melting stable glycol ester of a nuclearly hydrogenated polymerized rosin.

12. A relatively high melting stable penta erythritol ester of a nuclearly hydrogenated polymerized rosin.

ROBERT C. PALMER.

DISCLAIMER 2,300,433.—*Robert C. Palmer*, Pensacola, Fla. ESTER OF HYDROGENATED POLYMERIZED ROSIN AND METHOD OF MAKING THE SAME. Patent dated November 3, 1942. Disclaimer filed August 5, 1943, by the assignee, *Newport Industries, Inc.*

Hereby enters this disclaimer to claims 1, 8, 10, 11, and 12 in said specification.

[*Official Gazette August 31, 1943.*]